US012443049B2

(12) United States Patent
Li et al.

(10) Patent No.: US 12,443,049 B2
(45) Date of Patent: Oct. 14, 2025

(54) METHOD AND DEVICE FOR REMOVING BACKGROUND NOISE IN MICROSCOPIC IMAGING BASED ON FREQUENCY-DOMAIN MODULATION

(71) Applicant: ZHEJIANG NORMAL UNIVERSITY, Zhejiang (CN)

(72) Inventors: Chuankang Li, Jinhua (CN); Daru Chen, Jinhua (CN); Yuxian Lu, Jinhua (CN); Cuifang Kuang, Hangzhou (CN)

(73) Assignee: ZHEJIANG NORMAL UNIVERSITY, Jinhua (CN)

( * ) Notice: Subject to any disclaimer, the term of this patent is extended or adjusted under 35 U.S.C. 154(b) by 0 days.

(21) Appl. No.: 19/186,604

(22) Filed: Apr. 22, 2025

(65) Prior Publication Data
US 2025/0251613 A1 Aug. 7, 2025

(30) Foreign Application Priority Data
May 6, 2024 (CN) .......................... 202410547879.5

(51) Int. Cl.
*G02B 27/58* (2006.01)
*G01N 21/21* (2006.01)
(Continued)

(52) U.S. Cl.
CPC .............. *G02B 27/58* (2013.01); *G01N 21/21* (2013.01); *G01N 21/6458* (2013.01);
(Continued)

(58) Field of Classification Search
CPC ..................... G02B 27/58; G02B 21/0048; G02B 21/0076; G02B 27/141; G02B 27/286;
(Continued)

(56) References Cited

U.S. PATENT DOCUMENTS

| 2021/0140889 A1* | 5/2021 | Sherman ............ G01N 21/6486 |
| 2023/0120931 A1* | 4/2023 | Kastrup ............... G01N 33/582 |
| | | 436/172 |

(Continued)

FOREIGN PATENT DOCUMENTS

| CN | 102735617 A | 10/2012 |
| CN | 103364384 A | 10/2013 |
| CN | 103424859 A | 12/2013 |

OTHER PUBLICATIONS

Notification to Grant Patent Right for Invention in Chinese Application No. 202410547879.5 mailed on Oct. 25, 2024, 6 pages.
(Continued)

*Primary Examiner* — Dominic J Bologna
(74) *Attorney, Agent, or Firm* — PORUS IP LLC

(57) ABSTRACT

The present disclosure relates to a method and device for removing background noise in microscopic imaging based on frequency-domain modulation. The method includes irradiating a surface of a sample to be measured by simultaneously irradiating the surface of the sample by utilizing two beams from two laser devices. One of the two beams passes through a 0~2π vortex phase plate and then focuses on the sample to be measured to form a high-energy hollow spot, and the other of the two beams focuses on the sample to be measured to form a low-energy solid spot. The method further includes modulating the two beams in time-domain simultaneously using an electro-optic modulator and demodulating signal light at different frequencies using a lock-in amplifier, then removing the background noise by a differential process to realize a high signal-to-noise ratio super-resolution image.

5 Claims, 4 Drawing Sheets

(51) Int. Cl.
 *G01N 21/64* (2006.01)
 *G02B 21/00* (2006.01)
 *G02B 27/14* (2006.01)
 *G02B 27/28* (2006.01)

(52) U.S. Cl.
 CPC ..... *G02B 21/0048* (2013.01); *G02B 21/0076* (2013.01); *G02B 27/141* (2013.01); *G02B 27/286* (2013.01); *G01N 2021/6463* (2013.01); *G01N 2201/06113* (2013.01); *G01N 2201/0683* (2013.01); *G01N 2201/105* (2013.01)

(58) Field of Classification Search
 CPC ............... G01N 21/21; G01N 21/6458; G01N 2021/6463; G01N 2201/06113; G01N 2201/0683; G01N 2201/105
 See application file for complete search history.

(56) References Cited

U.S. PATENT DOCUMENTS

| | | | |
|---|---|---|---|
| 2023/0305280 A1* | 9/2023 | Kuang | ............... G02B 21/0076 |
| 2024/0183783 A1* | 6/2024 | Leutenegger | ........ G02B 21/367 |

OTHER PUBLICATIONS

Wang, Wensheng et al., Dual-modulation difference stimulated emission depletion microscopy to suppress the background signal, Advanced Photonics, 4(4): 1-8, 2022.

* cited by examiner

200

- 210: Collimating two laser beams emitted by the first laser device and the second laser device and adjusting polarization to obtain two beams of line-polarized light

- 220: Modulating the two beams of line-polarized light in time-domain so that a light intensity varies periodically over time, the two beams of line-polarized light being loaded with different modulation frequencies

- 230: Altering the polarization states of the two beams of line-polarized light to obtain two beams of right-handed circularly polarized light, and phase-modulating the high-power laser in the two beams of right-handed circularly polarized light and then combining with the low-power laser into a single beam

- 240: Projecting the right-handed circularly polarized light onto the sample to be measured to scan the sample to be measured to make that the phase-modulated high-power laser converges into a hollow spot on the sample to be measured, and the low-power laser converges into a solid spot on the sample to be measured

- 250: Receiving a signal light emitted by the sample to be measured during scanning, and performing demodulation at different frequencies on the received signal light to obtain a plurality of target images at corresponding frequencies

- 260: Performing a differential process on the plurality of target images and a background signal image to obtain corresponding images with low background noise

FIG. 2

METHOD AND DEVICE FOR REMOVING BACKGROUND NOISE IN MICROSCOPIC IMAGING BASED ON FREQUENCY-DOMAIN MODULATION

CROSS-REFERENCE TO RELATED APPLICATIONS

This application claims priority of Chinese Application No. 202410547879.5, filed on May 6, 2024, the entire contents of which are incorporated herein by reference

TECHNICAL FIELD

The present disclosure generally relates to a field of super-resolution technology, and particularly relates to methods and devices for removing background noise in microscopic imaging based on frequency-domain modulation.

BACKGROUND

There is a limit to the resolution achievable by conventional far-field optical microscopy methods due to the effects of diffraction from the optical system. According to the Abbe diffraction limit theory, the size of the spot formed by focusing of a light beam through a microscope objective are expressed as follows:

$$\Delta r = \frac{\lambda}{2NA},$$

where $\lambda$ is the operating wavelength of the microscope, and NA is the numerical aperture of the microscope objective used. Thus, the limiting resolution of conventional far-field optical microscopes is generally limited to about half a wavelength.

In order to break through the limitation of the optical diffraction limit and to improve the resolution of microscopy systems, researchers have proposed a variety of super-resolution optical microscopy methods, among which fluorescence excitation has received much attention. Some of the commonly used methods are Stimulated Emission Depletion Microscopy (STED), Structured Illumination Microscopy (SIM: Structured Illumination Microscopy), Stochastic Optical Reconstruction Microscopy (STORM), and so on.

In contrast to SIM, STED microscopy is an imaging technique based on a confocal microscope system that exhibits strong optical sectioning capability, enabling high signal-to-noise ratio imaging. Unlike Single Molecule Localization Microscopy (SMLM), which requires the acquisition of numerous images for post-processing reconstruction, STED microscopy permits real-time imaging with high temporal resolution. These advantages have established STED as the most widely adopted nanoscopy technique. The resolution of STED microscopy is governed by the laser power of the depletion beam. However, in practical applications, the depletion beam power cannot be increased indefinitely due to significant photobleaching and photodamage effects on fluorescent samples. These effects substantially reduce sample observability time, rendering the technique unsuitable for prolonged biological imaging. Furthermore, under extreme depletion beam irradiation, secondary excitation generates substantial background noise. Imaging reveals pronounced halo artifacts around bright spots, resulting from incomplete fluorescence depletion and secondary excitation phenomena.

Therefore, it is desired to provide a method and device for effectively removing background noise in STED imaging, and to improve imaging speed and resolution.

SUMMARY

The present disclosure provides a device for removing background noise based on frequency-domain modulation, comprising: a laser device and a sample stage carrying a sample to be measured, a space between the laser device and the sample stage sequentially arranged with: a glan prism configured to change polarization states of a laser beam emitted by the laser device to obtain line-polarized light, the laser beam including a high-power laser and a low-power laser; an electro-optic modulator configured to modulate intensities of two beams of the line-polarized light corresponding to the high-power laser and the low-power laser, to obtain two beams of line-polarized light with different preset frequencies; a 0~2π vortex phase plate configured to perform phase modulation of the high-power laser; a quarter-wave plate configured to change polarization states of the two beams of the line-polarized light to obtain two beams of right-handed circularly polarized light; a dichroic mirror configured to combine the low-power laser and the high-power laser with phase modulation into a single beam; a galvanometer scanner configured to deflect the optical path of right-handed circularly polarized light; a scanning lens and a field lens configured to focus and collimate a light beam emitted from the galvanometer scanner; a microscope objective configured to project a light beam emitted from the field lens onto the sample to be measured to make that the high-power laser with phase modulation converges into a hollow spot on the sample to be measured and the low-power laser converges into a solid spot on the sample to be measured; a detection module configured to collect signal light emitted by the sample to be measured; a lock-in amplifier configured to demodulate received signal light at a specific frequency to obtain an image at a corresponding scanning position; a controller configured to control the galvanometer scanner; and a signal generator configured to control a frequency of the electro-optic modulator and a frequency of the lock-in amplifier.

In some embodiments, a single-mode fiber and a collimating lens are arranged in sequence between the laser device and the glan prism, and are configured to filter and collimate the laser beam.

In some embodiments, the 0~2π vortex phase plate has a variable modulation function $f(p,\varphi)=\varphi$, where p donates a distance of a point on the beam from an optical axis, and q donates an angle of a polar coordinate vector of a position within a cross-section perpendicular to an optical axis of the beam from x-axis.

In some embodiments, the detection module includes a beam splitter, a bandpass filter, a detector, a collection lens, and a spatial filter. The beam splitter is arranged between the 0~2π vortex phase plate and the galvanometer scanner. The bandpass filter is configured to filter out stray light of a signal beam emitted from the beam splitter. The collection lens is configured to focus a filtered signal beam onto the detector. The spatial filter is disposed at a focal plane of the collection lens, and is configured to spatially filter the filtered signal beam. The detector is configured to detect a light intensity signal of the filtered signal beam.

In some embodiments, the beam splitter is determined according to the sample to be measured. When the sample to be measured is a fluorescent sample, the beam splitter employs a dichroic mirror. When the sample to be measured is a non-fluorescent sample, the beam splitter employs a polarized beam splitter.

In some embodiments, the spatial filter is made of a pinhole or a multimode fiber, and a diameter of the pinhole is smaller than an Airy spot diameter.

In some embodiments, the lock-in amplifier and the electro-optic modulator share the signal generator. The signal generator is configured to determine that frequencies of light beams modulated by the lock-in amplifier and the electro-optic modulator are identical.

In some embodiments, the numerical aperture (NA) of the microscope objective is 1.4.

As can be seen from the technical solutions described above, embodiments of the present disclosure disclose and provide a method and device for removing background noise based on frequency-domain modulation, which utilizes simultaneous time-domain modulation of two beams and processes the obtained signals in the frequency-domain. The secondary excitation fluorescence signal and the incomplete depletion background signal are effectively and quantitatively removed, which is characterized by a fast imaging speed, a simple device, and a high resolution.

BRIEF DESCRIPTION OF THE DRAWINGS

In order to more clearly illustrate the technical solutions in the embodiments or prior art of the present disclosure, the accompanying drawings required to be used in the descriptions of the embodiments or prior art will be briefly described hereinafter, and it will be obvious that the accompanying drawings in the following descriptions are only embodiments of the present disclosure, and that a person of ordinary skill in the art can obtain other accompanying drawings according to the accompanying drawings provided without exerting creative labor.

FIG. 2 is a flowchart illustrating an exemplary method for removing background noise in microscopic imaging based on frequency-domain modulation according to some embodiments of the present disclosure;

Figure 1:
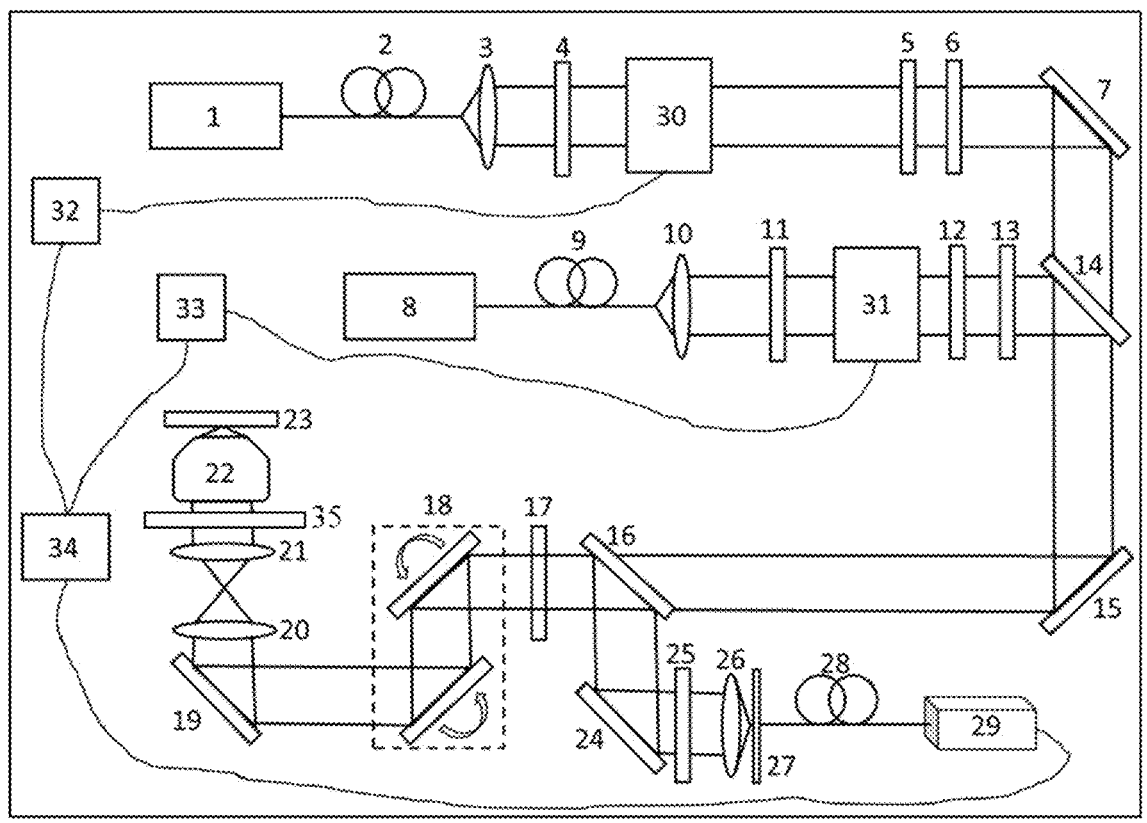
FIG. 1 is a structural diagram of a device for removing background noise in microscopic imaging based on frequency-domain modulation according to some embodiments of the present disclosure.

Attachment markers: 1—first laser device, 2—first singlemode fiber, 3—first collimating lens, 4—first glan prism, 5—first quarterwave plate, 6—halfwave plate, 7—first mirror, 8—second laser device, 9—second single—mode fiber, 10—second collimating lens, 11—second glan prism, 12—0~2π vortex phase plate, 13—second quarter—wave plate, 14—first dichroic mirror, 15—second mirror, 16—second dichroic mirror, 17—first bandpass filter, 18—galvanometer scanner, 19—third mirror, 20—scanning lens, 21—field lens, 22—microscope objective, 23—sample stage, 24—dielectric mirror, 25—second bandpass filter, 26—collection lens, 27—pinhole, 28—multimode fiber, 29—photomultiplier tube, 30—first electro—optic modulator, 31—second electro—optic modulator, 32—first signal generator, 33—second signal generator, 34—lock-in amplifier.

DETAILED DESCRIPTION

In order to more clearly illustrate the technical solutions of the embodiments of the present disclosure, the following will briefly describe the accompanying drawings to be used in the description of the embodiments. Obviously, the accompanying drawings in the following description are only some examples or embodiments of the present disclosure, and a person of ordinary skill in the art can apply the present disclosure to other similar scenarios in accordance with these drawings without creative labor. Unless obviously obtained from the context or the context illustrates otherwise, the same numeral in the drawings refers to the same structure or operation.

It should be understood that the terms "system", "device" as used herein, "unit," and/or "module" are used herein as a way to distinguish between different components, elements, parts, sections, or assemblies at different levels. However, said words may be replaced by other expressions if other words accomplish the same purpose.

In the description of the embodiments of the present disclosure, it should be noted that if terms such as "upper," "lower," "horizontal," "inner," etc., that indicate orientation or positional relationships are based on the orientation or positional relationships shown in the accompanying drawings, or the conventional placement of the product described in the present disclosure during use, these terms are used solely for the purpose of facilitating the description of the present disclosure and simplifying the explanation, and do not imply or require that the referred device or component must have a specific orientation or be constructed and operated in a specific orientation. Therefore, such terms should not be construed as limiting the scope of the present disclosure.

In the description of the embodiments of the present disclosure, it should also be noted that, unless otherwise expressly provided and limited, the existed term "setup" appears, "mounted", "connected", should be understood in a broad sense, for example, it can be a fixed connection, a removable connection, or a one-piece connection; it can be a mechanical connection; it can be an electrical connection; it can be a direct connection or an indirect connection through an intermediate medium; it can be a connection within two elements. For those of ordinary skill in the art, the specific meanings of the above terms in the present disclosure may be understood on a case-by-case basis.

In the practice of STED, the secondary excitation of a depletion beam under an ultra-high depletion beam irradiation produces a severe background signal. Accordingly, methods and devices are provided for efficiently removing background noise in STED imaging to improve imaging speed and resolution.

FIG. 1 is a structural diagram of a device for removing background noise in microscopic imaging based on frequency-domain modulation according to some embodiments of the present disclosure. As shown in FIG. 1, the device for removing background noise in microscopic imaging based on frequency-domain modulation (referred to as a background noise removal device) 100, includes: a laser device and a sample stage 23 carrying a sample to be measured. Between the laser device and the sample stage 23, a glan prism, an electro-optic modulator, a 0~2λ vortex phase plate 12, a quarter-wave plate, a dichroic mirror, a galvanometer scanner 18, a scanning lens 20, a field lens 21, a microscope objective 22, a detection module, a lock-in amplifier 34, a controller, and a signal generator are provided sequentially.

The laser device is configured to emit laser (or laser beams). The laser beams include a high-power laser and a low-power laser. In some embodiments, the laser device includes a first laser device 1 and a second laser device 8. The first laser device 1 is configured to emit a low-power laser. The second laser device 8 is configured to emit a high-power laser.

The glan prism is configured to change polarization states of the laser beam emitted by the laser device to obtain line-polarized light. In some embodiments, the glan prism includes a first glan prism 4 and a second glan prism 11. The first glan prism 4 and the second glan prism 11 are configured to change the polarization states of the laser beams emitted from the first laser device 1 and the second laser device 8 respectively, to obtain corresponding line-polarized light.

The electro-optic modulator is configured to modulate an intensity of the line-polarized light to obtain line-polarized light with different preset frequencies. In some embodiments, the electro-optic modulator includes a first electro-optic modulator 30 and a second electro-optic modulator 31. The first electro-optic modulator 30 and the second electro-optic modulator 31 are configured to modulate intensities of two beams of line-polarized light corresponding to the high-power laser and the low-power laser respectively, to obtain two beams of line-polarized light with different preset frequencies. For example, the low-power laser corresponds to a first preset frequency and the high-power laser corresponds to a second preset frequency.

The 0~2π vortex phase plate 12 is configured to perform phase modulation of the high-power laser emitted by the second laser device 8.

The quarter-wave plate is configured to change the polarization states of the line-polarized light to obtain right-handed circularly polarized light. In some embodiments, the quarter-wave plate includes a first quarter-wave plate 5 and a second quarter-wave plate 13. The first quarter-wave plate 5 and the second quarter-wave plate 13 are configured to change the polarization states of the two beams of line-polarized light respectively, to obtain two beams of right-handed circularly polarized light.

The dichroic mirror is configured to combine a plurality of beams into a single beam. In some embodiments, the dichroic mirror includes a first dichroic mirror 14 configured to combine the low-power laser and a phase-modulated high-power laser (also referred to as the high-power laser after phase modulation, i.e., the two beams of right-handed circularly polarized light obtained from the first quarter-wave plate 5 and the second quarter-wave plate 13) into a single beam, i.e., into a single beam of right-handed circularly polarized light.

The galvanometer scanner 18 is configured to deflect an optical path of the right-handed circularly polarized light. It is to be known that the right-handed circularly polarized light deflected here by the galvanometer scanner 18 is a beam of right-handed circularly polarized light obtained by combining the low-power laser with the phase-modulated high-power laser as described above.

The scanning lens 20 and the field lens 21 are configured to focus and collimate a beam emitted from the galvanometer scanner 18.

The microscope objective 22 is configured to project the beam emitted from the field lens 21 onto the sample to be measured, so that the phase-modulated high-power laser converges into a hollow spot on the sample to be measured, and the low-power laser converges into a solid spot on the sample to be measured.

The detection module is configured to collect signal light emitted by the sample to be measured.

The lock-in amplifier 34 is configured to demodulate the received signal light at a specific frequency to obtain an image at a corresponding scanning position.

The controller is configured to control the galvanometer scanner 18. In some embodiments, the controller also controls one or more other components of the background noise removal device 100. For example, the controller may control the laser emission power of the first laser device 1 and/or the second laser device 8. As another example, the controller controls the preset frequency of the obtained line-polarized light by controlling the electro-optic modulator 30.

The signal generator is configured to control a frequency of the electro-optic modulator 30 and a frequency of the lock-in amplifier 34. In some embodiments, the signal generator includes a first signal generator 32 and a second signal generator 33. The first signal generator 32 is configured to control (e.g., via a controller) the frequency of the electro-optic modulator 30, and the second signal generator 33 is configured to control (e.g., via a controller) the frequency of the lock-in amplifier 34.

Furthermore, a single-mode fiber and a collimating lens are provided sequentially between the laser device and the glan prism and are configured to filter and collimate the laser beam respectively. For example, a first single-mode fiber 2 and a first collimating lens 3 are provided in sequence between the first laser device 1 and the first glan prism 4 for filtering and collimating the low-power laser. A second single-mode fiber 9 and a second collimating lens 10 are provided in sequence between the second laser device 8 and the second glan prism 11 for filtering and collimating the high-power laser.

Further, the 0~2π vortex phase plate 12 has a variable modulation function (1):

$$f(p, \varphi) = \varphi, \tag{1}$$

where, p donates a distance between a point on the beam from an optical axis, and φ donates an angle of a polar coordinate vector of a position within a cross-section perpendicular to an optical axis of the beam from x-axis.

In some embodiments, the detection module includes: a beam splitter, a second bandpass filter 25, a detector, a collection lens 26, and a spatial filter.

The beam splitter is an optical device for splitting a light beam into two or more beams, or for combining a plurality of beams into a single beam. The beam splitter is arranged between the 0~2π vortex phase plate 12 and the galvanometer scanner 18.

The second bandpass filter 25 is configured to filter out stray light in a signal beam emitted from the beam splitter. In some embodiments, the second bandpass filter 25 is omitted when the sample to be measured is a non-fluorescent sample.

The collection lens 26 is configured to focus a filtered signal beam onto the detector.

The spatial filter is disposed at a focal plane of the collection lens 26 and is configured to spatially filter the signal beam.

The detector is configured to detect a light intensity signal of the signal beam. In some embodiments, the detector is a photomultiplier tube (PMT) 29.

In some embodiments, the beam splitter is determined based on the actual sample to be measured. For example, when the sample to be measured is a fluorescent sample, the beam splitter employs a second dichroic mirror 16. When the sample to be measured is a non-fluorescent sample, the beam splitter employs a polarized beam splitter.

In some embodiments, the spatial filter employs a pinhole 27 or a multimode fiber 28. The diameter of the pinhole 27 is less than an Airy spot diameter. In some embodiments, the pinhole 27 has a diameter of at least one of 0.95 Airy spot diameter, 0.9 Airy spot diameter, 0.84 Airy spot diameter, 0.73 Airy spot diameter, 0.6 Airy spot diameter, etc.

In some embodiments, the lock-in amplifier 34 and the electro-optic modulators (including the first electro-optic modulator 30 and the second electro-optic modulator 31) share a same signal generator. The signal generator is configured to determine that frequencies of light beams modulated by the lock-in amplifier 34 and the electro-optic modulators are identical. The preset frequency is set according to the actual sample to be measured, and in actual use, adjusting the signal generator enables the lock-in amplifier 34 and the electro-optic modulator to operate at the preset frequency. The signal generator loads the electro-optic modulator and the lock-in amplifier 34 at equal frequencies.

A numerical aperture (NA) of the microscope objective 22 is a very important parameter in the microscope optics, used as an indicator to describe the ability of the microscope objective 22 to collect light and resolution. In some embodiments, the numerical aperture (NA) of the microscope objective 22 is 1.4.

Referring to the structural diagram of the background noise removal device 100 in FIG. 1, in some embodiments, the first single-mode fiber 2, the first collimating lens 3, the first glan prism 4, the first electro-optic modulator 30, the first quarter-wave plate 5, the half-wave plate 6, and the first mirror 7 are sequentially disposed on an optical axis of the beam (also referred to as the laser beam(s)) emitted from the first laser device 1. The second single-mode fiber 9, the second collimating lens 10, the second glan prism 11, the second electro-optic modulator 31, the 0~2π vortex phase plate 12, and the second quarter-wave plate 13 are sequentially disposed on an optical axis of the beam emitted from the second laser device 8.

The first dichroic mirror 14 is disposed on an optical axis of a beam (also referred to as a light beam) modulated by the 0~2π vortex phase plate 12. In some embodiments, the second dichroic mirror 16, the first bandpass filter 17, and the galvanometer scanner 18 are disposed sequentially on an optical axis of a light beam deflected by the second mirror 15. The scanning lens 20, the field lens 21, the microscope objective 22, and the sample stage 23 are disposed sequentially on an optical axis of a beam emitted from the galvanometer scanner 18. In some embodiments, the second bandpass filter 25, the collection lens 26, the pinhole 27, the multimode fiber 28, and the photomultiplier tube 29 are disposed sequentially on an optical axis of a reflected beam passing through a dielectric mirror 24. The pinhole 27 is disposed at the focal plane of the collection lens 26.

The controller is connected to the galvanometer scanner 18 and configured to load control the scan of the galvanometer scanner 18.

In some embodiments, the background noise removal device 100 further includes an achromatic quarter-wave plate 35. The achromatic quarter-wave plate 35 is positioned between the field lens 21 and the microscope objective 22. The difference between this background noise removal device and the previously described device 100 lies in the fact that, in this configuration, the first quarter-wave plate 5 and the second quarter-wave plate 13 are respectively used to perform phase compensation on the two beams of line-polarized light with different preset frequencies modulated by the first electro-optic modulator 30 and the second electro-optic modulator 31, ensuring that the two beams of line-polarized light are strictly line-polarized light. The strictly line-polarized light passes through optical components such as the dichroic mirror, the galvanometer scanner 18, the scanning lens 20, and the field lens 21, and is converted into the circularly polarized light by the achromatic quarter-wave plate 35, which is ultimately projected onto the sample to be measured via the microscope objective 22. As a result, the phase-modulated high-power laser converges into a hollow spot on the sample to be measured, while the low-power laser converges a solid spot on the sample to be measured.

In some embodiments, the background noise removal device 100 further includes a processor. Since a maximum laser intensity (or a depletion beam power) that the sample or the fluorescent molecule can withstand is limited, in order to ensure that a resolution of the STED imaging is safe and reliable, the processor may pre-determine, based on characteristics of the sample to be measured and the preset frequency of the second electro-optic modulator 31, a preferred laser intensity of the high-power laser emitted by the second laser device 8; determine, based on the preferred laser intensity, a second laser emission power of the second laser device 8; and control, based on the second laser emission power, the second laser device 8 emitting laser.

The characteristics of the sample to be measured include a sample type, a sample size, and a maximum laser intensity that the sample can withstand.

In some embodiments, the processor determines, based on a clustering analysis, the preferred laser intensity of the high-power laser emitted by the second laser device 8. Merely by way of example, the processor constructs a plurality of clustering vectors and a target vector. For example, the processor constructs the plurality of clustering vectors based on historical data. The historical data includes characteristics of historical samples to be measured and corresponding historical preset frequencies of the second electro-optic modulator 31. Each clustering vector includes characteristics of a historical sample to be measured and a historical preset frequency. Each clustering vector is labeled with a corresponding historical preferred laser intensity. In some embodiments, the processor determines a laser intensity of the high-power laser employed by the historical de-backgrounding process with a best imaging quality from a plurality of historical de-backgrounding processes corresponding to each of the clustering vectors, as a label corresponding to the clustering vector. In the present disclosure, the imaging quality is a weighted sum of a resolution of fluorescent molecules in the sample to be measured (i.e., a clarity of the fluorescent molecules) and an amount of sample damage (destruction of the fluorescent molecules in the sample). A weight of the resolution is negative. The smaller the weighted sum, the better the imaging quality. The processor constructs the target vector based on characteristics of a current sample to be measured and a current preset frequency.

In some embodiments, the processor clusters the plurality of clustering vectors and the target vector based on clustering metrics to obtain a plurality of clustering clusters. The processor determines a clustering cluster including the target vector as a target clustering cluster, and uses an average of preferred laser intensities corresponding to the clustering vectors in the target clustering cluster as the preferred laser intensity corresponding to the target vector. The clustering metrics include the characteristics of the sample to be measured and the preset frequency.

In some embodiments, when the sample to be measured is a non-fluorescent sample, a fluorescent substance may be added to the non-fluorescent sample to enable STED imaging of the sample to be measured. Then, the processor predetermines a preferred laser intensity of the high-power laser emitted by the second laser device 8 based on characteristics of the sample to be measured, fluorescent molecular characteristics of fluorescent molecules added to the sample to be measured, and the preset frequency. The fluorescent molecular characteristics of the sample to be measured include a type of the fluorescent molecule, a maximum laser intensity that the fluorescent molecule can withstand, a lifetime, a quantum efficiency, and a saturation intensity. The maximum laser intensity that the fluorescent molecule can withstand is a range of laser intensities that may be preset.

Similar to the aforementioned clustering analysis, the processor also determines, based on the clustering analysis, a preferred laser intensity of the high-power laser emitted by the second laser device 8 based on the characteristics of the sample to be measured, the fluorescent molecular characteristics of the fluorescent molecules added to the sample to be measured, and the preset frequency. Merely by way of example, the processor constructs a plurality of clustering vectors and a target vector. For example, the processor constructs a plurality of clustering vectors based on historical data. The historical data includes characteristics of historical samples to be measured, historical fluorescent molecular characteristics of historical fluorescent molecules added to the historical samples to be measured, and corresponding historical preset frequencies. Each of the clustering vectors includes characteristics of a historical sample to be measured, historical fluorescent molecular characteristics of fluorescent molecules added to a historical sample to be measured, and a historical preset frequency. Each of the clustering vectors is labeled with a corresponding historical preferred laser intensity. The processor constructs a target vector based on characteristics of a current sample to be measured, current fluorescent molecular characteristics of fluorescent molecules added to the sample to be measured, and a current preset frequency.

Further, the processor clusters the plurality of clustering vectors and the target vector based on clustering metrics to obtain a plurality of clustering clusters. The processor determines a clustering cluster including the target vector as a target clustering cluster, and uses an average of preferred laser intensities corresponding to the clustering vectors in the target clustering cluster as a preferred laser intensity corresponding to the target vector. The clustering metrics includes the characteristics of the sample to be measured, the fluorescent molecular characteristics of the fluorescent molecules added to the sample to be measured, and the preset frequency.

In some embodiments, the processor also determines a preferred laser intensity for the high-power laser emitted by the second laser device 8 based on characteristics of the sample to be measured and a preset frequency, using a laser intensity determination model.

The laser intensity determination model refers to a model for determining a preferred laser intensity of the high-power laser emitted by the second laser device 8. In some embodiments, the laser intensity determination model is a machine learning model. For example, the laser intensity determination model includes one or more of a deep neural network (DNN) model, a neural network model, a recurrent neural network model, etc.

In some embodiments, an input to the laser intensity determination model include characteristics of the sample to be measured and the preset frequency. An output of the laser intensity determination model is a preferred laser intensity for the high-power laser.

In some embodiments, the processor obtain the laser intensity determination model by a training based on a large number of first training samples and first labels corresponding to the first training samples. For example, the processor obtains the large number of the first training samples and the first labels corresponding to the first training samples as a training dataset, and performs a plurality of rounds of iterations; when an end-of-iteration condition is satisfied, the iteration is ended, and a trained model is obtained. At least one iteration in the plurality of rounds of iteration includes: selecting one or more first training samples from the training dataset to input into the laser intensity determination model, obtaining model prediction output(s) corresponding to the one or more first training samples; substituting the model prediction output(s) and the corresponding first label(s) into a formula of a predefined loss function, calculating value(s) of the loss function; and reversely updating a parameter in the model based on the value(s) of the loss function. The reverse updating may be realized in various ways, such as updating by gradient descent. The end-of-iteration condition may be that the loss function converges, a count of iterations reaches a threshold, and so on.

In some embodiments, the first training sample includes characteristics of a historical sample to be measured and a historical preset frequency from a plurality of historical background noise removal processes. The first label of the first training sample is a sample preferred laser intensity corresponding to the first training sample. Similarly, the processor determines the sample preferred laser intensity corresponding to the first training sample based on the clustering analysis, which is not further described herein.

In some embodiments, in the training dataset used to train the laser intensity determination model, a count of training samples for each sample category is greater than a corresponding preset number threshold. The sample category is a predetermined categorization of a plurality of samples to be measured, with a categorization criterion being a count of species of the fluorescent molecules in the sample to be measured. The preset number threshold is related to a count of species of the fluorescent molecules in the sample to be measured in a corresponding sample category. The larger the count of species of the fluorescent molecules in the sample to be measured, the larger the preset number threshold. The processor divides the training dataset based on the sample category, obtains a plurality of training sample subsets, and performs alternative training of different training sample subsets.

Further, after determining the preferred laser intensity of the high-power laser emitted by the second laser device 8, the processor may determine the second laser emission power based on a laser intensity formula (2).

$$I = \frac{P}{A}, \tag{2}$$

where I donates the preferred laser intensity in W/m², P donates the second laser emission power in W, and A donates a cross-sectional area of the laser beam in m². In some embodiments, the cross-sectional area of the laser beam may be set as desired.

In some embodiments, in order to avoid crosstalk between the two laser beams emitted by the first laser device 1 and the second laser device 8, and at the same time to ensure the imaging quality (resolution), the frequencies (or pulse frequencies) of the two laser beams that are ultimately irradiated on the sample to be measured need to be set in a suitable range. The processor is further configured to: determine a reference frequency range based on an absorption spectra and an emission spectra of the fluorescent molecules added to the sample to be measured; determine the preset frequency based on the reference frequency range, the characteristics of the sample to be measured, and the fluorescent molecular characteristics, the preset frequency including a first preset frequency and a second preset frequency; send a first frequency modulation instruction, based on the first preset frequency, to cause the first signal generator 32 perform frequency control of the first electro-optic modulator 30 and the lock-in amplifier 34, and, control the first laser device 1 to emit the low-power laser based on the first preset frequency; send a second frequency modulation instruction, based on the second preset frequency, to cause the second signal generator 33 perform frequency control of the second electro-optic modulator 31 and the lock-in amplifier 34, and, control the second laser device 8 to emit laser based on the second preset frequency. In some embodiments, the lock-in amplifier 34 includes a first lock-in amplifier and a second lock-in amplifier for frequency control in conjunction with the first electro-optic modulator 30 and the second electro-optic modulator 31 respectively.

In some embodiments, the processor determines the reference frequency range corresponding to the fluorescent molecules added to the sample to be measured by searching a database. For example, the database is pre-stored with a corresponding relationship between the absorption spectra and the emission spectra of the fluorescent molecules and the reference frequency range. The processor retrieves the database based on the absorption spectra and the emission spectra of the fluorescent molecules added to the sample to be measured, thereby determining the reference frequency range corresponding to the fluorescent molecules added to the sample to be measured. It is to be appreciated that the database may be preset by a technician. A setup criteria may be to ensure that a laser successfully excites the fluorescent molecules, e.g., to ensure that a wavelength of the laser is close to an absorption peak of the fluorescent molecules and shorter than an emission peak of the fluorescent molecules.

In some embodiments, the preset frequency is determined by a vector database. The vector database includes a plurality of feature vectors. Each feature vector may be constructed from a reference frequency range of an experimental fluorescent molecule, characteristics of an experimental sample to be measured, and fluorescent molecular characteristics of the experimental fluorescent molecule. A label corresponding to each feature vector is the experimental preset frequency corresponding to the feature vector. In some embodiments, the processor determines, out of a plurality of experiments corresponding to the experimental fluorescent molecule corresponding to the feature vector, a first laser frequency and a second laser frequency used in an experiment with a maximum weighted sum of an excitation coverage of the fluorescent molecules and quenching of the fluorescent molecules, as the label for the feature vector. The excitation coverage of the fluorescent molecules is a ratio of a count of excited fluorescent molecules to a count of added fluorescent molecules. The bursting of the fluorescent molecule is a phenomenon in which a fluorescence intensity emitted by an excited fluorescent molecule decreases. Fluorescence quenching may occur when the laser frequency is too high, resulting in a weakening of a detected fluorescence signal.

The processor constructs a target vector based on the reference frequency range corresponding to the fluorescent molecules added to the sample to be measured, the characteristics of the sample to be measured, and the fluorescent molecular characteristics.

Further, the processor selects a feature vector with a highest similarity to the target vector and takes a label corresponding to the feature vector as the preset frequency corresponding to the target vector.

In some embodiments, the processor is further configured to: adjust a first laser frequency of the low-power laser and a second laser frequency of the high-power laser based on a first laser emission power of the first laser device 1 and a second laser emission power of the second laser device 8. In other words, the processor adjusts a frequency difference between the high-power laser and the low-power laser based on a light intensity difference between the high-power laser forming a hollow spot and the low-power laser forming a solid spot by controlling the preset frequency of the electro-optic modulator (including the first electro-optic modulator 30 and the second electro-optic modulator 31) and/or the lock-in amplifier 34.

In some embodiments, the processor determines, by a first preset table, a range of difference between the first laser frequency and the second laser frequency for which the imaging quality is best under a difference between the first laser emission power and the second laser emission power.

The first preset table is obtained based on historical data statistics. For example, the first preset table is constructed by differences between historical first laser emission powers and the historical second laser emission powers in a plurality of historical de-backgrounding processes and differences between the first laser frequencies and the second laser frequencies in processes of a plurality of historical preset quality thresholds that a final imaging quality is greater than a preset quality threshold in the plurality of historical de-backgrounding processes. The preset quality threshold is set empirically.

Within the reference frequency range corresponding to the fluorescent molecules added to the sample to be measured, the processor adjusts the first laser frequency and the second laser frequency to make the first laser frequency and the second laser frequency satisfying the range of difference between the first laser frequency and the second laser frequency.

Based on the structure shown in FIG. 1, the signal light emitted from the sample to be measured is collected by the microscope objective 22, then passes through the field lens 21, the scanning lens 20, the third mirror 19, the galvanometer scanner 18, and the second dichroic mirror 16 in sequence, and is finally reflected. The signal beam is filtered out of the stray light by the second bandpass filter 25, then is focused by the collection lens 26 and spatially filtered through the pinhole 27, and finally received by the photomultiplier tube 29.

Some embodiments of the present disclosure also provide a method for removing background noise in microscopic imaging based on frequency-domain modulation (referred to as a de-background noise method). FIG. 2 is a flowchart illustrating an exemplary method for removing background noise in microscopic imaging based on frequency-domain modulation according to some embodiments of the present disclosure; The method 200 for removing background noise is implemented based on the background noise removal device 100 as shown in FIG. 1. The de-background noise method 200 includes the following steps as shown in FIG. 2.

In 210, two laser beams emitted by the first laser device 1 and the second laser device 8 are collimated and polarization adjusted to obtain two beams of line-polarized light. The two laser beams include a low-power laser emitted by the first laser device 1 and a high-power laser emitted by the second laser device 8. The two laser beams differ in light intensity by at least two orders of magnitude.

In some embodiments, the two laser beams emitted by the first laser device 1 and the second laser device 8 are collimated by the first collimating lens 3 and the second collimating lens 10, respectively.

In some embodiments, before collimating laser, the two laser beams emitted by the first laser device 1 and the second laser device 8 are also filtered via the first single-mode fiber 2 and the second single-mode fiber 9, respectively.

In some embodiments, two beams of line-polarized light are obtained by using the first glan prism 4 and the second glan prism 11 to change polarization states of the low-power laser and the high-power laser, respectively.

In 220, the two beams of line-polarized light corresponding to the low-power laser and the high-power laser are modulated in time-domain so that a light intensity varies periodically over time, and the two beams of line-polarized light are loaded with different modulation frequencies (or different preset frequencies, as previously described).

In some embodiments, the first electro-optic modulator 30 and the second electro-optic modulator 31 are utilized to modulate the intensity of the two beams of line-polarized light corresponding to the low-power laser and the high-power laser, respectively, and to obtain the two beams of line-polarized light with different preset frequencies.

In 230, the polarization states of the two beams of line-polarized light are altered to obtain two beams of right-handed circularly polarized light, and the high-power laser in the two beams of right-handed circularly polarized light is phase-modulated and then combined with the low-power laser into a single beam.

In some embodiments, prior to combining, the polarization states of the two beams of line-polarized light are altered to obtain two beams of right-handed circularly polarized light by using the first quarter-wave plate 5 and the second quarter-wave plate 13, respectively.

In some embodiments, the 0~2π vortex phase plate 12 is employed to phase modulate the high-power laser in two beams of line-polarized light.

In some embodiments, the first dichroic mirror 14 is utilized to combine a phase-modulated high-power laser and the low-power laser into the single beam.

In 240, the right-handed circularly polarized light is projected onto the sample to be measured to scan the sample to be measured to make that the phase-modulated high-power laser converges into a hollow spot on the sample to be measured, and make the low-power laser converges into a solid spot on the sample to be measured.

In some embodiments, the galvanometer scanner 18, the scanning lens 20, the field lens 21, and the microscope objective 22 are used sequentially to project the right-handed circularly polarized light onto the sample to be measured to scan the sample to be measured, so that the phase-modulated high-power laser converges into the hollow spot on the sample to be measured, and the low-power laser converges into the solid spot on the sample to be measured. More descriptions regarding the galvanometer scanner 18, the scanning lens 20, the field lens 21, and the microscope objective 22 may be found elsewhere in the present disclosure, e.g., FIG. 1 and related descriptions thereof, which will not be repeated herein.

In 250, a signal light emitted by the sample to be measured during scanning is received, and demodulation at different frequencies is performed on the received signal light to obtain a plurality of target images at corresponding frequencies.

In some embodiments, the detection module is utilized to collect the signal light emitted by the sample to be measured. In some embodiments, the lock-in amplifier 34 is utilized to demodulate a received signal light at a specific frequency to obtain a target image at a corresponding scan position.

In 260, a differential process is performed on the plurality of target images and a background signal image to obtain corresponding images with low background noise. The background signal image is obtained under a same condition as the target image obtained but without placing the sample to be measured on the sample stage 23. In other words, subtracting the background signal image from the target image yields the corresponding image with low background noise.

Figure 3:
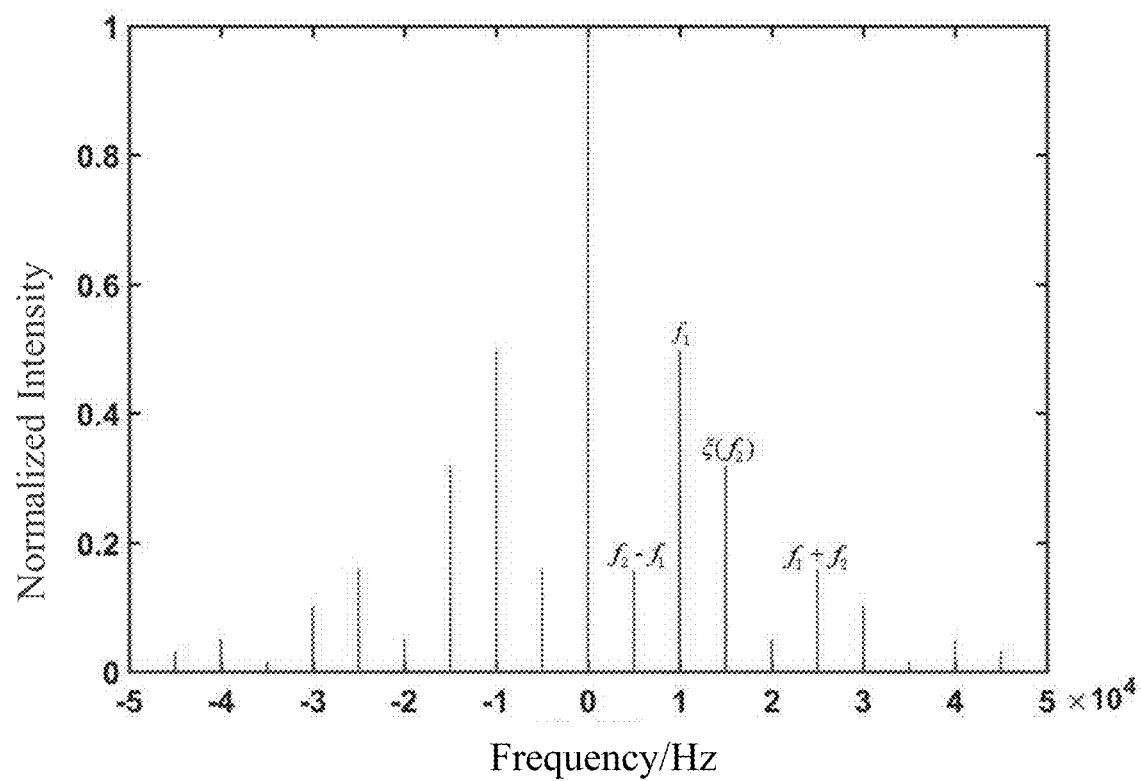
FIG. 3 is a schematic diagram of a distribution of a plurality of signal components after frequency-domain transform according to some embodiments of the present disclosure.
Figure 4:
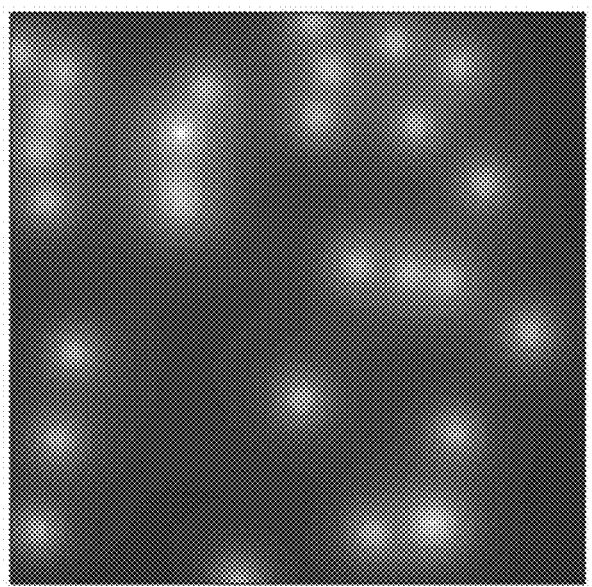
FIG. 4 is an imaging diagram of a fluorescence molecular obtained by a conventional STED microscopy.
Figure 5:
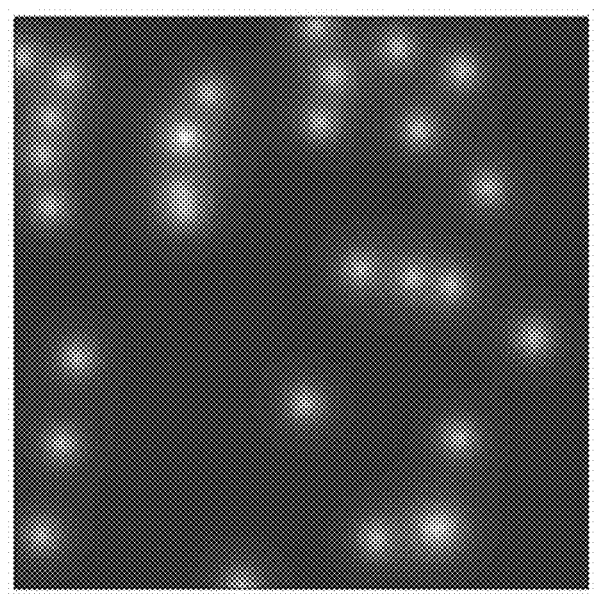
FIG. 5 is an imaging diagram of a fluorescence molecular obtained by STED after employing a method of removing background noise according to some embodiments of the present disclosure.

FIG. 3 is a schematic diagram of a distribution of a plurality of signal components after frequency-domain transform according to some embodiments of the present disclosure. FIG. 4 is an imaging diagram of a fluorescence molecular obtained by a conventional STED microscopy. FIG. 5 is an imaging diagram of a fluorescence molecular obtained by STED after employing a method of removing background noise according to some embodiments of the present disclosure.

The principle of the present technical solution is as follows: with reference to FIG. 4, due to the effect of diffraction of the optical system, after the illumination beam incident in parallel has been focused by the microscope objective 22, a spot formed on the sample to be measured is not an ideal point, but a diffraction spot with a certain size. The samples within an illumination range of the diffraction spot emit a corresponding signal light, which makes the details of the samples within the illumination range indistinguishable, thereby limiting the resolution of the microscope system. To break through the optical diffraction limit and improve the resolution of the microscope, it is critical to reduce the area of the effective signal light at the scanning point.

In the method for removing background noise provided in some embodiments of the present disclosure, referring to FIGS. 1 to 3, when the signal generators (e.g., the first signal generator 32 and the second signal generator 33) output at a frequency of f, a modulated light beam is focused on the sample by the microscopic objective lens 22 to form a solid spot with a pulse frequency of f. A size of the solid spot is the same as a size of the diffraction spot resulting from focusing of an illumination beam used in conventional optical microscopy. When a modulation function of the 0~2π vortex phase plate 12 is, as calculated by the Debye integral, the spot formed on the sample after focusing of the modulated light beam by the microscope objective 22 is a donut-shaped hollow spot.

The solid spot and the hollow spot come from different laser devices (specifically, the solid spot comes from the first laser device 1 and the hollow spot comes from the second laser device 8) and arrive at the imaging surface after different modulations without introducing any other device specialized in changing a spot size. After modulation by a vortex phase map of the 0~2π vortex phase plate 12, a size of the hollow spot (corresponding to the high-power laser) is larger than a size of the solid spot (corresponding to the low-power laser), but a center dark spot region of the hollow spot is smaller than the solid spot.

The light intensity of the hollow spot is much greater than that of the solid spot, and a signal light emitted from the sample irradiated by the solid spot is suppressed within the irradiation range of the hollow spot, so that signals collected by the detector are the light emitted from the sample irradiated by a center portion of the solid spot and the hollow spot. Taking f as the reference signal frequency of the lock-in amplifier 34, when the received signal light passes through the lock-in amplifier 34, only a signal with a pulse frequency of f is capable of being output.

By modulating the low-power laser at $f_1$ frequency and the high-power laser at $f_2$ frequency, and then transforming the resulting signals in frequency-domain, the individual signals may be distributed in the frequency-domain in a discrete manner, as shown in FIG. 3. An effective signal is $f_1$, and background signals are mainly $(f_1-f_2)$ (or $(f_2-f_1)$), $f_2$, and $(f_1+f_2)$); the differential process of the above signals at a later stage results in imaging with low background noise, as shown in FIG. 5.

The embodiments of the present disclosure disclose a method for removing background noise in microscopic imaging based on frequency-domain modulation, utilizing simultaneous time-domain modulation of two light beams, processing the obtained signals in the frequency-domain, and efficiently and quantitatively removing the secondary excitation fluorescence signal and the incomplete depletion background singal, which can effectively remove the background noise in STED imaging and is characterized by fast imaging speed, simple device, and high resolution.

The foregoing description of the disclosed embodiments enables a person skilled in the art to realize or use the present disclosure. Multiple modifications to these embodiments will be apparent to those skilled in the art, and the general principles defined herein may be realized in other embodiments without departing from the spirit or scope of the present disclosure. Accordingly, the present disclosure will not be limited to these embodiments shown herein, but rather will be subject to the broadest possible scope consistent with the principles and novel features disclosed herein.

What is claimed is:

1. A device for removing background noise based on frequency-domain modulation, comprising: a laser device and a sample stage carrying a sample to be measured, a space between the laser device and the sample stage sequentially arranged with:
    a glan prism configured to change polarization states of a laser beam emitted by the laser device to obtain line-polarized light, the laser beam including a high-power laser and a low-power laser;
    an electro-optic modulator configured to modulate intensities of two beams of the line-polarized light corresponding to the high-power laser and the low-power laser to obtain two beams of line-polarized light with different preset frequencies;
    a 0~2π vortex phase plate configured to perform phase modulation of the high-power laser;
    a quarter-wave plate configured to change polarization states of the two beams of line-polarized light to obtain two beams of right-handed circularly polarized light;
    a dichroic mirror configured to combine the low-power laser and the high-power laser after phase modulation into a single beam;
    a galvanometer scanner configured to deflect an optical path of right-handed circularly polarized light; a scanning lens and a field lens configured to focus and collimate a light beam emitted from the galvanometer scanner;
    a microscope objective configured to project a light beam emitted from the field lens onto the sample to be measured to make the high-power laser after phase modulation converge into a hollow spot on the sample to be measured and make the low-power laser converge into a solid spot on the sample to be measured;
    a detection module configured to collect signal light emitted by the sample to be measured;
    a lock-in amplifier configured to demodulate the received signal light at a specific frequency to obtain an image at a corresponding scanning position;
    a controller configured to control the galvanometer scanner; and
    a signal generator configured to control a frequency of the electro-optic modulator and a frequency of the lock-in amplifier; wherein
        a single-mode fiber and a collimating lens are arranged in sequence between the laser device and the glan prism and are configured to filter and collimate the laser beam;
        the 0~2π vortex phase plate has a variable modulation function $f(p,\varphi)=\varphi$, where p donates a distance of a point on a beam from an optical axis, and φ donates an angle of a polar coordinate vector of a position within a cross-section perpendicular to an optical axis of the beam from x-axis; and
        the detection module includes a beam splitter, a bandpass filter, a detector, a collection lens, and a spatial filter, wherein
            the beam splitter is arranged between the 0~2π vortex phase plate and the galvanometer scanner,
            the bandpass filter is configured to filter out stray light of a signal beam emitted from the beam splitter,
            the collection lens is configured to focus the filtered signal beam onto the detector,
            the spatial filter is disposed at a focal plane of the collection lens, and is configured to spatially filter the filtered signal beam, and
            the detector is configured to detect a light intensity signal of the filtered signal beam.

2. The device according to claim 1, wherein the beam splitter is determined according to the sample to be measured, wherein
    when the sample to be measured is a fluorescent sample, the beam splitter employs a dichroic mirror, and
    when the sample to be measured is a non-fluorescent sample, the beam splitter employs a polarized beam splitter.

3. The device according to claim 1, wherein the spatial filter is made of a pinhole or a multimode fiber, and a diameter of the pinhole is smaller than an A iry spot diameter.

4. The device according to claim 1, wherein the lock-in amplifier and the electro-optic modulator share the signal generator, and the signal generator is configured to determine that frequencies of light beams modulated by the lock-in amplifier and the electro-optic modulator are identical.

5. The device according to claim 1, wherein a numerical aperture (NA) of the microscope objective is 1.4.

* * * * *